| United States Patent [19]
Roussel et al.

[11] Patent Number: 4,877,452
[45] Date of Patent: Oct. 31, 1989

[54] COMPOUND CEMENT, MORE PARTICULARLY USABLE IN BORE HOLES

[75] Inventors: Michel Roussel, Paris; Daniel Baffreau, St Maur Les Fosses, both of France

[73] Assignees: Entreprise Gagneraud Pere & Fils; Total Compagnie Francaise des Petroles, both of Tokyo, Japan

[21] Appl. No.: 187,542

[22] Filed: Apr. 28, 1988

[30] Foreign Application Priority Data

May 14, 1987 [FR] France .............................. 87 06774

[51] Int. Cl.$^4$ ........................... C04B 7/02; C04B 7/14
[52] U.S. Cl. ....................................... 106/97; 106/117
[58] Field of Search ................................. 106/97, 117

[56] References Cited

FOREIGN PATENT DOCUMENTS 55-010425  1/1980  Japan ................................. 106/117
59-091190  5/1984  Japan ................................. 106/117

OTHER PUBLICATIONS

"Specification for Materials and Testing for Well Cements", API Specification 10 (Spec 10) Fourth Edition, Aug. 1988.

Primary Examiner—William R. Dixon, Jr.
Assistant Examiner—Anthony J. Green
Attorney, Agent, or Firm—Browdy and Neimark

[57] ABSTRACT

The invention concerns a compound cement containing cement and a blast-furnace slag, more particularly for bore holes.

This compound cement is characterized in that it comprises the following components:

a Portland cement presenting, by weight, a magnesium oxide content of max. 6%, a sulphur trioxide content of max. 3%, an insoluble residue of max. 0.75%, a tricalcium silicate content between 48 and 65%, a tricalcium aluminate content of max. 3%, a total amount formed by the amount of tetracalcium aluminoferrite, plus the amount of dicalcium ferrite, plus two times the amount of tricalcium aluminate which is at most equal to 24%, and a total amount of alkalies, calculated as sodium oxide equivalents, of max. 0.75%.

and a ground blast-furnace slag with a vitrification rate of 90 to 100%;

these two components presenting a similar mesh size, comprised between 2,800 and 3,000 cm$^2$/g, and being mixed together in the following wt-% proportion: 50 to 10% of Portland cement and 50 to 90% of ground slag.

4 Claims, 6 Drawing Sheets

COMPOUND CEMENT, MORE PARTICULARLY USABLE IN BORE HOLES

FIELD OF THE INVENTION

The present invention relates to a compound cement of a type suitable for being used at high temperatures, and, more particularly, in the bore holes for petroleum production, mines nd geothermics.

BACKGROUND OF THE INVENTION

The cements used in oil-wells are classified in various classes according to the depth, the temperature and the pressure at which they are used, and also as a function of the compressive mechanical strength and of the resistance to the action of sulfates which are whished. This is the reason why the American Petroleum Institute (API) has set up a classification of the Portland cements from class A to class J with sub-classes MSR if a moderate sulfate resistance is wished and HSR if a high sulfate resistance is wished.

At present, it is necessary to stock on the working site various categories of cement, and use must be made of expensive additives, and especially of retarders of set for the high-temperature areas. Some of these retarders cause irregular setting times of the cements and perturb their hardening. It is furthermore observed that the mechanical properties of all the cements which are presently available fall off rapidly in course of time when the hardened cement is subjected to temperatures higher than 110° C. An exception is a cement belonging to class F of the API, since it already contains 30% silica. The addition of silica limits in fact the fall off at high temperatures of the mechanical properties, but this addition jeopardizes the stability and the homogeneity of the cement formulas, since the siliceous products are not subjected to strict rules concerning the mesh size, the specific surface and the purity grade: this addition involves furthermore an increased consumption of additives, in particular of liquifiers, and makes it difficult to obtain dense cements.

SUMMARY OF THE INVENTION

An aim of the present invention is to provide for a cement which can be used within a wide range of boring depths and temperatures withiut requiring large amounts of additives, and which, after its hardening, develops quickly a high mechanical resistance, the latter decreasing comparatively little when the cement is subjected to temperatures higher than 110° C.

According to the present invention, it has been found that this aim could be reached by means of a mixture of a special Portland cement and of a ground blast-furnace slag, both components having a similar mesh size which is comprises between well-determined limits.

Consequently, the invention has for its object a compound cement comprising the following components:

a Portland cementcomprising, by weight, a magnesium oxide content of max. 6%, a sulphur trioxide content of max. 3%, an insoluble residue of max. 0.75%, a tricalcium silicate content between 48 and 65%, a tricalcium aluminate content of ma. 3%, a total amount formed by the amount of tetracalcium aluminoferrite, plus the amount of dicalcium ferrite, plus two times the amount of tricalcium aluminate which is at most equal to 24%, and a total amount of alkalies calculates as sodium oxide equivalent of max. 0.75%;

and a ground blast-furnace slag with a vitrification rate of 90 to 100%;

these two constituants presenting a similar mesh size, comprising between 2,800 and 3,000 cm$^2$/g, and being mixed together in the following wt-% proportion: 50 to 10% of Portland cement and 50 to 90% of ground slag.

This mixture presents in particular the advantage of allowing an easier adjustment of the time during which the pumping of the cement is possible (or "pumpability time"), so that a cement composed in this manner can be used within a temperature range from +2° to +200° C., or even more. It necessitates little additive, it presents an excellent reactivity and it makes it possible to obtain very good mechanical strengths which are preserved at high temperatures, even under high temperature conditions.

The choice of this Portland cement which corresponds to class G-HSR in the API classification, and of this mesh size which is the same for the cement and for the blast-furnace slag, is essential for the obtention of the contemplated result. It is well-known that, for the builing construction, and in the case of large works, use has already been made of cements containing high amounts of blast-furnace slag with a very fine mesh size (4,000 to 5,000 cm$^2$/g), in order to avoid, during the hardening of the cement, overheatings which could cause crackings; such cements are of no interest in the bore holes, since the thickness of the cementation is relatively low in such cases, so that the risk of crackings caused by the thickness is not to be feared, and since such cements would not allow the obtention of the above-indicated characteristics which are of prime importance for this kind of applications.

The compound cement which is the subject matter of the invention is quite suitable for being used in the bore holes. However, it may be advantageously used in other technical fields, such as the construction of underground works like the stocking tanks which are liquid- and gas-tight and which are able to resist to corrosive media and to high temperatures.

For certain uses, it is possible to add to this compound cement a low amount of fly ash.

The preferred composition of this compound cement is about 25 wt-% of Portland cement and 75 wt-% of ground slag.

BRIEF DESCRIPTION OF THE DRAWINGS

By means of the appended figures and of the following tables, the advantages of the invention will be explained in greater detail, with particular reference to an embodiment of the invention.

DETAILED DESCRIPTION OF THE INVENTION

Figure 1:
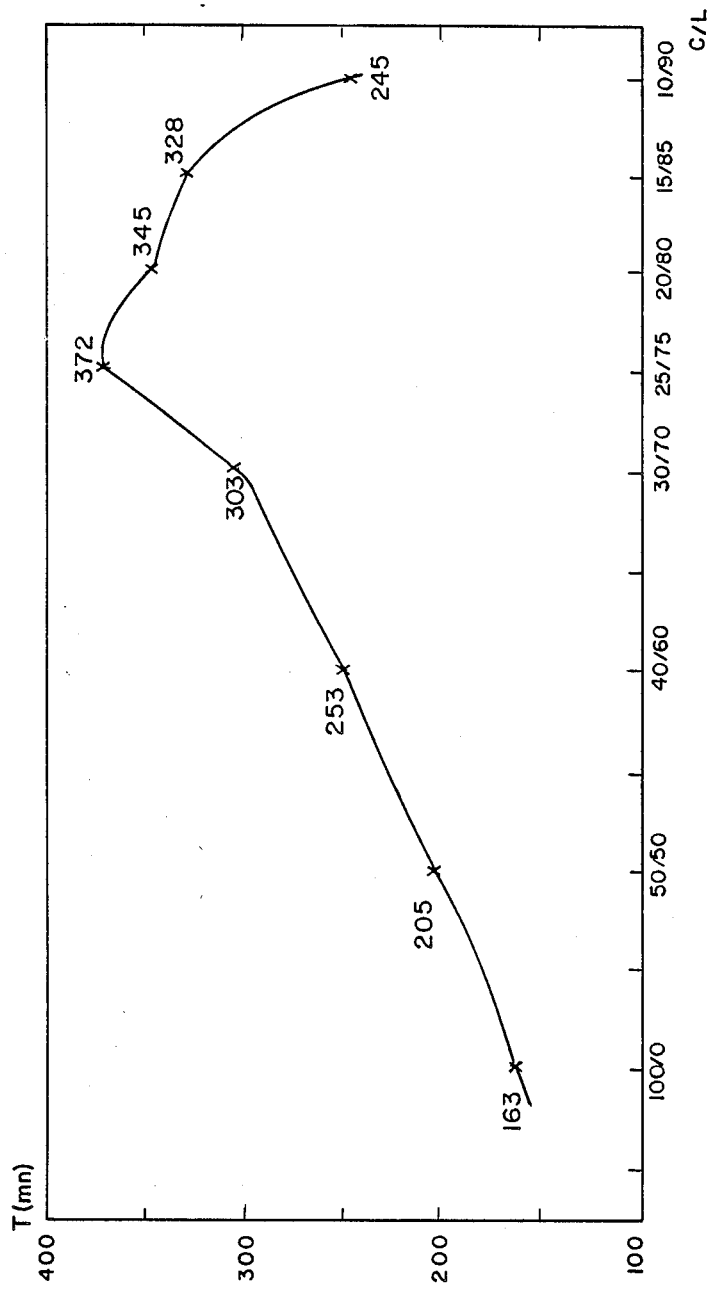
FIG. 1 represents the variations of the pumpability time of the compound cement as a function of the relative proportions of cement and slag, in the presence of a retarder of set.
Figure 7:
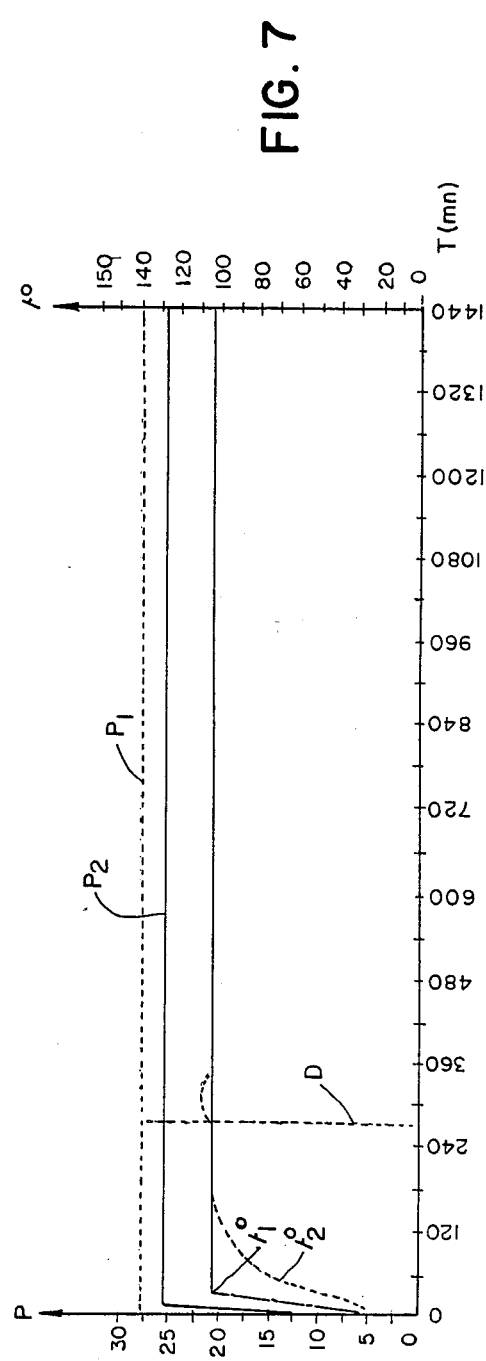
FIGS. 7 to 12 show the behaviour of the compound cement according to the invention in areas with gases.

On FIG. 1, the weight percentage of cement and slag (C/L) in the compound cement has been laid off as abscissa, and the pumpability time T in minutes has been laid off as ordinates. The values of the curve relate to the case of a Dycherhoff G-HSR cement mixed with the blast-furnace slag with a mesh size of 3,000 cm$^2$/g which was mixed with distilled water, and to tests carried out at 85° C. and at a final pressure of 700 bars. The curve shows that the longest pumpability time is obtained with a compound cement containing 25 wt-% of cement and 75 wt-% of ground slag.

Figures 2, 6:
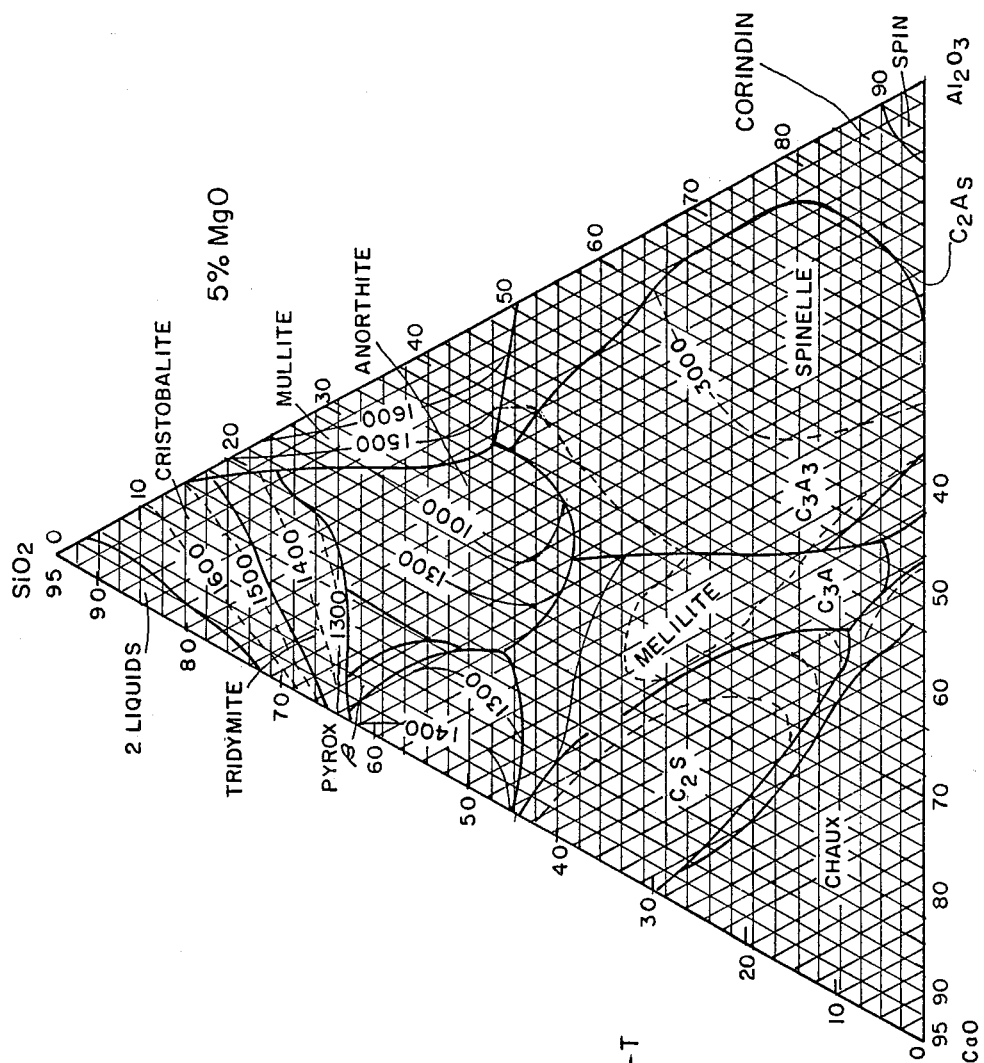
FIGS. 2 to 4 are triangular diagrams of the contents of alumina, silica and lime of a slag for an amount of magnesia which is, respectively, 5, 7 and 10%.
FIG. 6 shows the variation in course of time of the compressive strength under very high temperature conditions of a Portland cement and of a cement which is composed by the latter and by slag.
Figure 3:
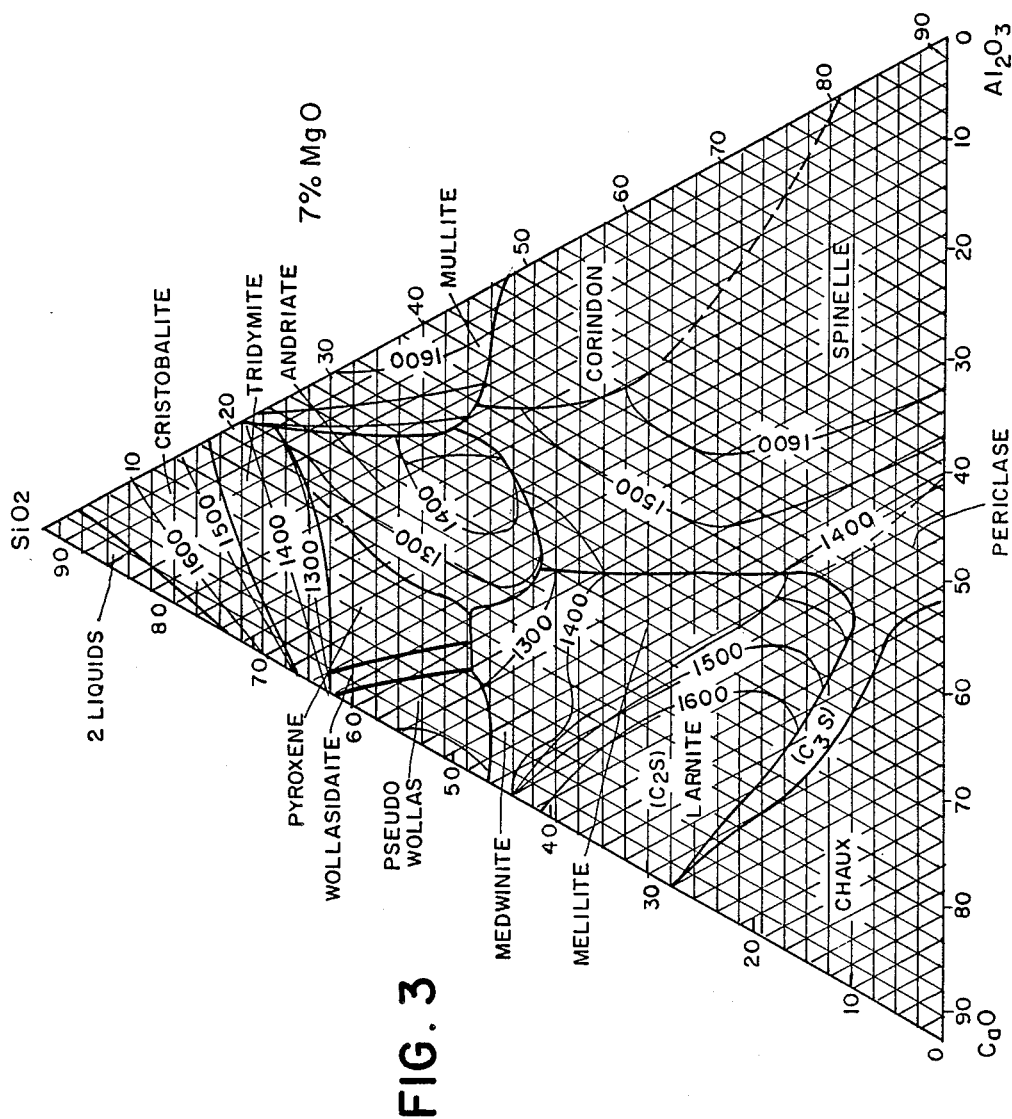
Figure 4:
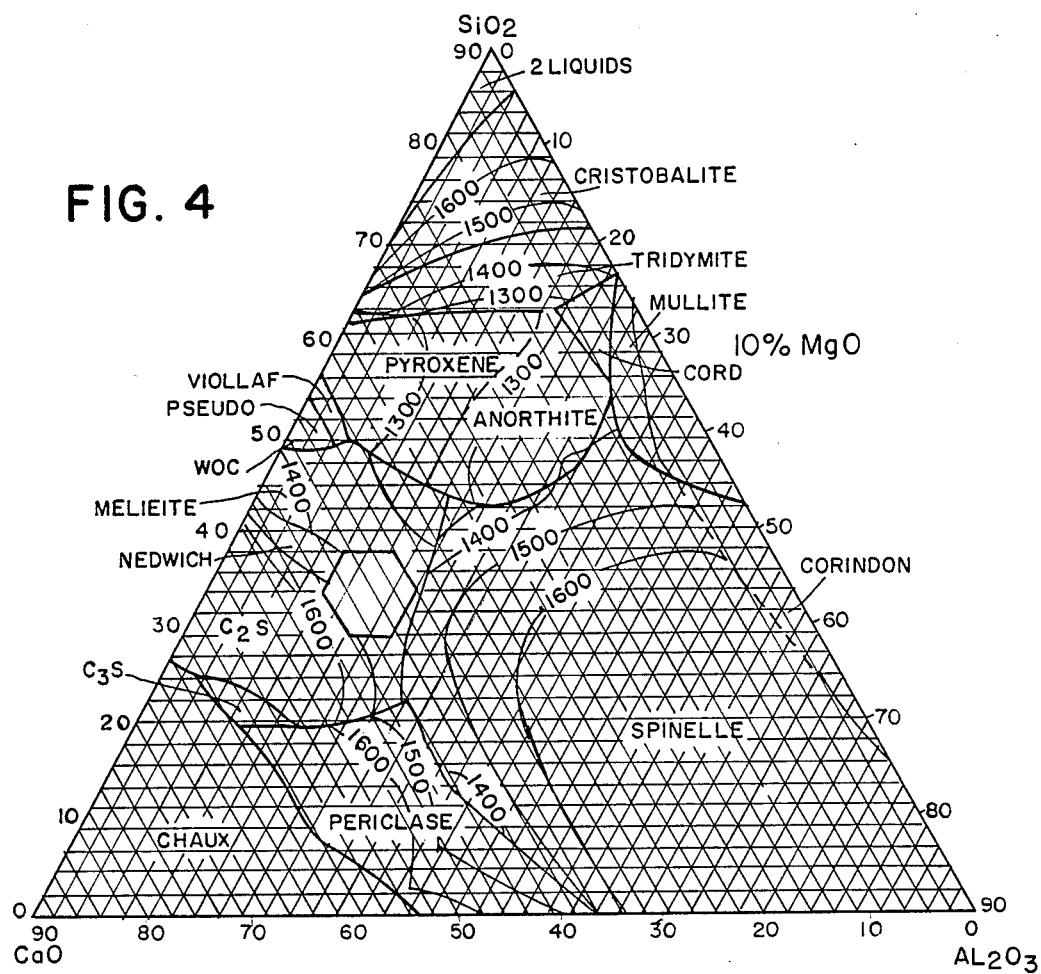

In order to obtain a constant quality with the compound cements according to the invention, it is necessary to use vitrified slags with a fairly regular chemical composition. A typical chemical composition of blast-furnace slag is the following one, in wt-%: $CaO=42\pm2$; $SiO_2=36\pm2$; $Al_2O_3=10\pm3$; $MgO=7\pm3$; $MnO=0.20$; $TiO_2=0.70$; $P_2O_5=0.010$; $S=0.95$; $K_2O=0.40$; $FeO=0.30$. FIGS. 2–4 show triangular diagrams evidencing the areas in which the composition of the slag may be situated with respect to three of its principal elements: $CaO$, $SiO_2$ and $Al_2O_3$, whereby the contents of MgO, which is the fourth main element, is respectively equal to 5, 7 and 10%, these areas having been delimited by a heavy line.

The blast-furnace slags which have been cooled rapidly by air and water have a vitreous structure and consequently present by themselves a hydraulic potential which depends of their chemical composition. The best hydraulic properties are observed for a vitrification rate from 90 to 100%.

The hydraulical properties are usually characterised by means of indexes which are calculated from the results of the chemical elementary analysis, and by considering the potential mineralogical composition calculated from the proportions of the four main components which form the three main solid phases in their stable crystallized state:

$C^3S^2$ or rankinite

| | |
|---|---|
| $C^2AS$ or gehlenite | melitite, solution of these |
| $C^2MS^2$ or akermanite | two compounds | with more or less important proportions, either of CS or wollastonite, or of $C^3MS^2$ or mehrwinite, or of $C^2S$ or bicalcium silicate, whereby the letters which are used in these simplified formulas have the following meaning: $C=CaO$; $S=SiO_2$; $A=Al_2O_3$; $M=MgO$.

Finely ground blast-furnace slags with a vitreous structure present the property of producing hydrated silicates and aluminates when they are admixed with setting activators like lime, calcium sulfate, Portland clinker and solutions of alkaline salts or salts of the alkaline-earths. The crystallized phase probably presents the form of micro-crystals which are disseminated throughout the vitreous phase and which play the part of seeds for the vitreous silicates during their hydratation.

The hydratation proceeds in the following manner in the case of an activation with Portland clinker admixed with calcium sulfate:

Formation of ettringite due to the reaction of $SO_4Ca$ with the tricalcium aluminate of the clinker and with the alumina of the slag;

Hydratation of the tricalcium silicate (simplified formula: $C^3S$) of the clinker and of the silicates of the slag;

Partial transformation of the ettringite into monosulfoaluminate and into hydrated alumina, and further hydratation of the silicates.

The hydrated silicates issuing from the slag are dense and they present a low porosity, which explains the resistance to aggressive waters of all kinds of compound cements containing blast-furnace slags.

It can be noticed that the hydratation of the vitrified blast-furnace slag is slow. Its admixture to Portland cement presents the advantage of also slowing down the hydratation of the latter with delays which vary as a function of the percentage of slag. Since the initial hydraulic setting is thus delayed by itself, it is possible to notably reduce the addition of retainers which are always very expensive.

Due to the potential mineralogical composition of the vitrified blast-furnace slag, the proportion of bicalcium silicate which is present in its crystallized and vitreous forms is very low (less than 5%), and, in the case of the compound cement according to the invention, the observed decrease of the initially obtained high resistances is slow, which is not the case with the pure Portland cements, the mechanical strength of which decreases rapidly, since such cements contain high amounts of crystallized bicalcium silicate.

Figure 5:
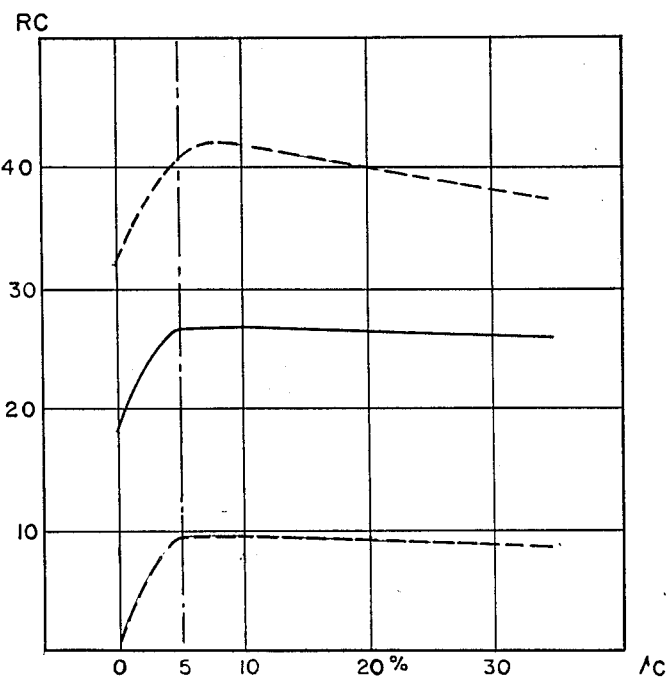
FIG. 5 shows the influence of the crystallization rate of the blast-furnace slag on the compressive strength of the compound cement, this resistance being measured, respectively, 2, 7 and 28 days after the setting under normal conditions.
Figure 8:
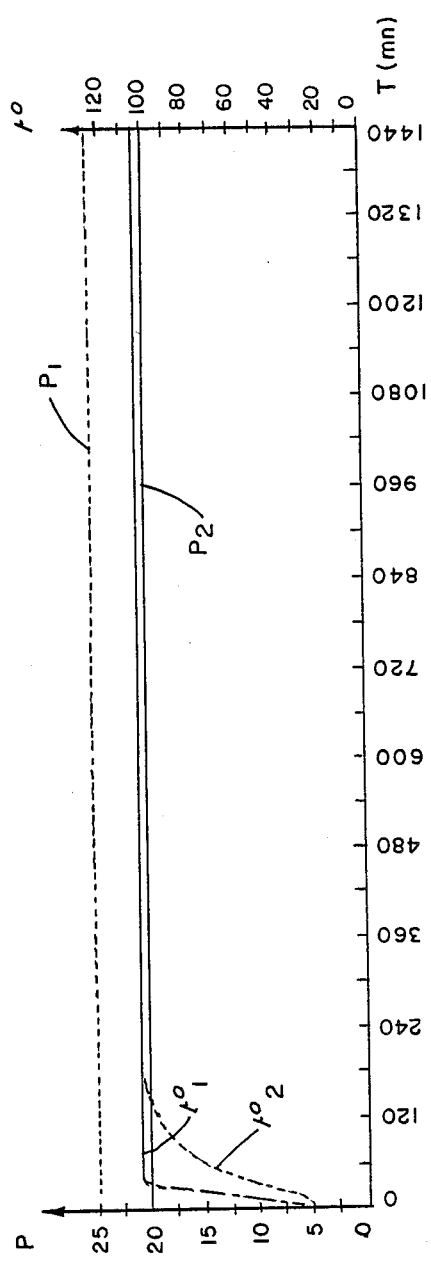
Figure 9:
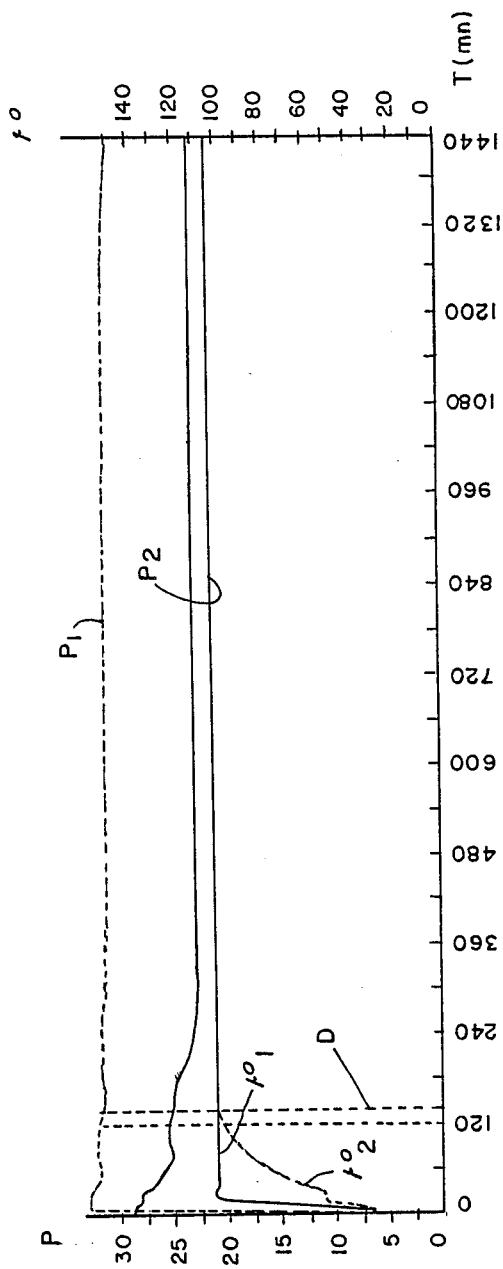
Figure 10:
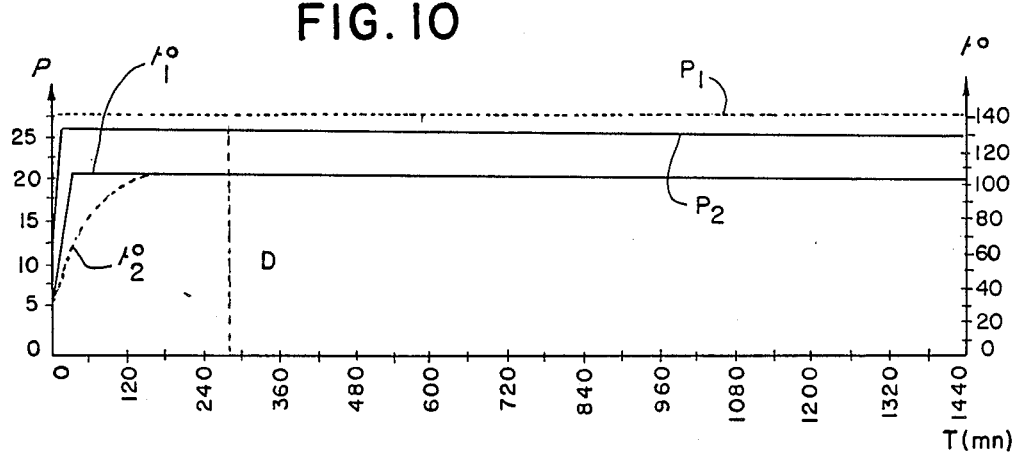
Figure 11:
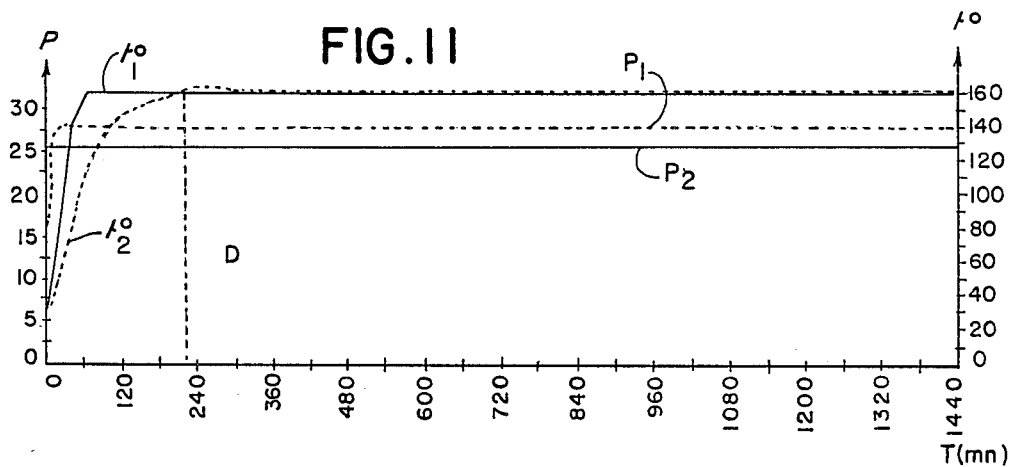
Figure 12:
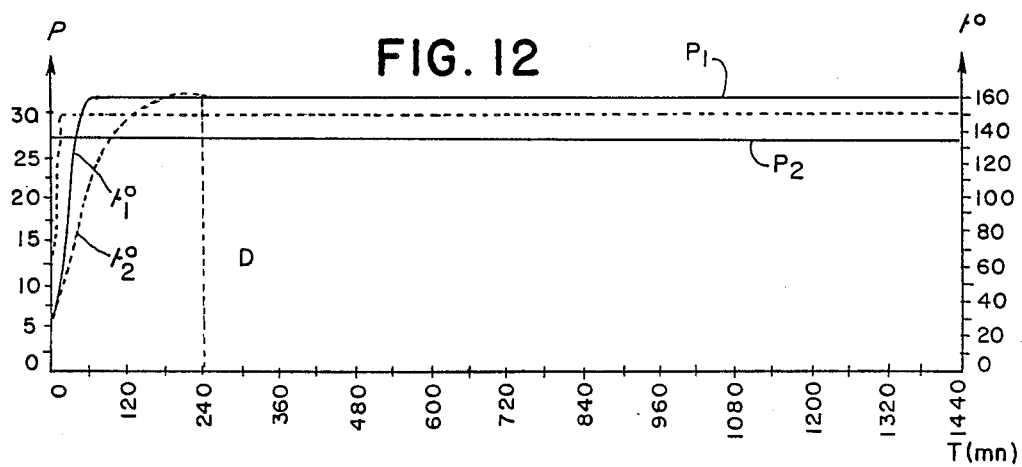

FIG. 5 shows the influence of the crystallization rate $t_c$ (x-axis) on the compressive strength RC of the compound cement (y-axis). The lower curve corresponds to the strength measured after 2 days, the middle curve to the strength measured after 7 days and the upper curve to the strength measured after 28 days under normal temperature conditions. It can be seen that the best compressive strength is obtained when the crystallization rate is equal to 5%.

Tests have been carried out more particularly with a compound cement, the Portland cement of which had the following chemical composition: silica ($SiO_2$)=21.2%; alumina ($Al_2O_3$)=3.40%; iron oxide ($Fe_2O_3$)=6%; lime (CaO)=64.3%; magnesia (MgO): 0.6%; potassium oxide ($K_2O$)=0.6%; sulfuric anhydride ($SO_3$)=2.2%; titanium oxide ($TiO_2$)=0.16%; manganese oxide (MnO)=0.17%; sodium oxide ($Na_2O$)=0.15%; chromium oxide ($Cr_2O_3$)=0.019%; phosphorous oxide ($P_2O_5$)=0.09%. This Portland cement presents a loss by roasting of 1.0% and a neglectable insoluble residue. The potential mineralogical composition of this cement, in %, was the following one: tricalcium silicate ($3CaOSiO_2$)=61.88; tricalcium aluminate ($3CaOAl_2O_3$)=0; tetracalcium aluminoferrite+dicalcium ferrite ($4CaOAl_2O_3)Fe_2O_3+2CaOFe_2O_3$)=17.34; total amount of alkalies as sodium oxide equivalents ($0.658\times\%$ $K_2O$)+% $Na_2O$)=0.5448.

The compound cement comprised 25% of this Portland cement and 75% of ground vitreous blast-furnace slag and it presented a mesh size of 3,000 cm$^2$/g. For certain tests, it was admixed with various additives taken among those which are commonly used in the petroleum industry.

Tables I, II, III, IV and V (Pages 8–12) show the results of tests carried out after mixing this compound cement, respectively, with soft water, with sea water, with water saturated with salt, with soft water with 5% sodium chloride and with soft water with 1% calcium chloride.

With this compound cement, various filtrate reducers were also tested: D-603, D-8 and D-600 of DOWELL; HALLAD 9, 14, 22, 22A, 24 of HALLIBURTON; D 19, D 22, D 45-L of B J HUGHES; PARAGAS of TOTAL. Table VI (Page 13) shows the result of the tests which have been carried out.

TABLE I

BEHAVIOUR OF THE 25/75 COMPOUND CEMENT IN SOFT WATER

STANDARD API TESTS

| | TEST CONDITIONS | Density Slag Cement | Free Water (ml) | Rheology VP (cP) | YV (Pa) | Compressive strength 8 h | 16 h | 24 h | 72 h | Gel 0/10 (Pa) | Pumpability time Consistency unit (CU) |
|---|---|---|---|---|---|---|---|---|---|---|---|
| SCH 1 | Static temp.: 35° C. Circulation temp.: 27° C. Pressure: 6,900 KPa | 1.865 | — | 42 | 15.4 | — | — | 3.1 MPa | 17.0 MPa | 8/10 | 630 min: 100 CU (extrapolated) 460 min: 60 CU |
| SCH 2 | Static temp.: 44° C. Circulation temp.: 33° C. Pressure: 10,350 KPa | 1.865 | — | 42 | 15.7 | 0.8 MPa | 4.2 MPa | 7.7 MPa | 26.3 MPa | 8/10 | 360 min: 100 CU (extrapolated) 307 min: 60 CU 260 min: 40 CU |
| SCH 3 | Static temp.: 60° C. Circulation temp.: 39° C. Pressure: 17,940 KPa | 1.87 | — | 42 | 16.0 | 5.5 MPa | 15.1 MPa | 19.3 MPa | 32.6 MPa | 8/9 | 320 min: 100 CU 237 min: 40 CU |
| SCH 4 | Static temp.: 77° C. Circulation temp.: 45° C. Pressure: 26,910 KPa | 1.87 | — | 39 | 15.8 | — | 25.7 MPa | 32.3 MPa | 39.6 MPa | 6/9 | 218 min: 100 CU (extrapolated) 190 min: 70 CU |
| SCH 5 | Static temp.: 93° C. Circulation temp.: 52° C. Pressure: 35,880 KPa | 1.87 | — | 36 | 16.4 | — | — | — | 41.4 | 5/8 | 128 min: 100 CU |

TABLE II

BEHAVIOUR OF THE 25/75 COMPOUND CEMENT IN SEA WATER

STANDARD API TESTS

| | TEST CONDITIONS | Density Slag Cement | Free Water (ml) | Rheology VP (cP) | YV (Pa) | Compressive strength 8 h | 16 h | 24 h | 72 h | Gel 0/10 (Pa) | Pumpability time Consistency unit (CU) |
|---|---|---|---|---|---|---|---|---|---|---|---|
| SCH 1 | Static temp.: 35° C. Circulation temp.: 27° C. Pressure: 6,900 KPa | 1.87 | — | 48 | 12.0 | — | 6.5 MPa | 16.6 MPa | 44.4 MPa | 6.2/ 6.7 | 555 min: 100 CU |
| SCH 2 | Static temp.: 44° C. Circulation temp.: 33° C. Pressure: 10,350 KPa | 1.87 | — | 45 | 13.0 | 1.7 MPa | 22.5 MPa | 34.3 MPa | 49.1 MPa | 6.2/ 6.2 | 485 min: 100 CU |
| SCH 3 | Static temp.: 60° C. Circulation temp.: 39° C. Pressure: 17,940 KPa | 1.87 | — | 42 | 13.92 | 4.8 MPa | 38.2 MPa | 41.6 MPa | 46.7 MPa | 6/ 6.2 | 338 min: 100 CU |
| SCH 4 | Static temp.: 77° C. Circulation temp.: 45° C. Pressure: 26,910 KPa | 1.87 | — | 39 | 14.4 | — | 26.7 MPa | 35.5 MPa | 41.6 MPa | 5.3/ 5.3 | 198 min: 100 CU |
| SCH 5 | Static temp.: 93° C. Circulation temp.: 52° C. Pressure: 35,880 KPa | 1.87 | — | 38 | 16.8 | — | — | — | — | 5.3/ 7.2 | 156 min: 100 CU |

TABLE III

BEHAVIOUR OF THE 25/75 COMPOUND CEMENT IN SATURATED SALT WATER

STANDARD API TESTS

| | TEST CONDITIONS | Density Slag Cement | Free Water (ml) | Rheology VP (cP) | YV (Pa) | Compressive strength 8 h | 16 h | 24 h | 72 h | Gel 0/10 (Pa) | Pumpability time Consistency unit (CU) |
|---|---|---|---|---|---|---|---|---|---|---|---|
| SCH 1 | Static temp.: 35° C. Circulation temp.: 27° C. Pressure: 6,900 KPa | 1.93 | 3.6 | 40 | 5.76 | — | — | 2.60 MPa | 19.80 MPa | 3.84/ 4.8 | — |
| SCH 2 | Static temp.: 44° C. Circulation temp.: 33° C. Pressure: 10,350 KPa | 1.93 | — | 40 | 5.54 | 0.21 MPa | 7.28 MPa | 14.0 MPa | 27.80 MPa | 4.25/ 5.81 | — |
| SCH 3 | Static temp.: 60° C. Circulation temp.: 39° C. Pressure: 17,940 KPa | 1.93 | — | 41 | 8.64 | — | 12.32 MPa | 14.50 MPa | 29.50 MPa | 5.28/ 6.24 | — |
| SCH 4 | Static temp.: 77° C. Circulation temp.: 45° C. Pressure: 26,910 KPa | 1.93 | — | 37 | 8.32 | — | — | — | — | 5.28/ 6.24 | — |
| SCH 5 | Static temp.: 93° C. Circulation temp.: 52° C. Pressure: 35,880 KPa | 1.93 | — | 33 | 8.16 | — | — | — | — | 5.28/ 6.24 | 985 min: 100 CU |

TABLE IV

BEHAVIOUR OF THE 25/75 COMPOUND CEMENT + 5% NaCl (by weight of water)

| TEST CONDITIONS | | Density Slag Cement | Free Water (ml) | Rheology VP (cP) | YV (Pa) | Compressive strength 8 h | 16 h | 24 h | 72 h | Gel 0/10 (Pa) | Pumpability time Consistency unit (CU) |
|---|---|---|---|---|---|---|---|---|---|---|---|
| SCH 1 | Static temp.: 35° C. Circulation temp.: 27° C. Pressure: 6,900 KPa | 1.87 | 2.6 | 43 | 7.68 | — | 9.85 MPa | 17.6 MPa | 25.9 MPa | 5.76/ 5.76 | 455 min: 100 CU 290 min: 40 Cu |
| SCH 2 | Static temp.: 44° C. Circulation temp.: 33° C. Pressure: 10,350 KPa | 1.87 | — | 40 | 16.8 | 4.39 MPa | 25.9 MPa | 32.3 MPa | 39.10 MPa | 6.24/ 6.72 | 375 min: 100 CU |
| SCH 3 | Static temp.: 60° C. Circulation temp.: 39° C. Pressure: 17,940 KPa | 1.87 | — | 38 | 14.4 | 17.78 MPa | 29.6 MPa | 32.2 MPa | 34.0 MPa | 6.24/ 6.85 | 245 min: 100 CU |
| SCH 4 | Static temp.: 77° C. Circulation temp.: 45° C. Pressure: 26,910 KPa | 1.87 | — | 37 | 16.32 | — | 23.10 MPa | 31.1 MPa | 32.2 MPa | 6.24/ 7.68 | 174 min: 100 CU |
| SCH 5 | Static temp.: 93° C. Circulation temp.: 52.° C. Pressure: 35,880 KPa | 1.87 | — | 36 | 17.76 | — | — | — | — | 6.72/ 8.64 | 110 min: 100 CU |

TABLE V

BEHAVIOUR OF THE 25/75 COMPOUND CEMENT + 1% CaCl$_2$ (by weight of water)

| TEST CONDITIONS | | Density Slag Cement | Free Water (ml) | Rheology VP (cP) | YV (Pa) | Compressive strenght 8 h | 16 h | 24 h | 72 h | Gel 0/10 (Pa) | Pumpability time (CU) |
|---|---|---|---|---|---|---|---|---|---|---|---|
| SCH 1 | Static temp.: 35° C. Circulation temp.: 27° C. Pressure: 6,900 KPa | 1.87 | 2.6 | 44 | 14.4 | — | 3.92 MPa | 7.42 MPa | 27.95 MPa | 6.72/ 7.68 | 943 min: 100 CU |
| SCH 2 | Static temp.: 44° C. Circulation temp.: 33° C. Pressure: 10,350 KPa | 1.87 | — | 42 | 13.60 | 2.324 MPa | 9.60 MPa | 18.83 MPa | 42.25 MPa | 6.24/ 7.20 | 360 min: 100 CU |
| SCH 3 | Static temp.: 60° C. Circulation temp.: 39° C. Pressure: 17,940 KPa | 1.87 | — | 42 | 11.52 | 10.22 MPa | 24.80 MPa | 31.50 MPa | 49.60 MPa | 5.76/ 6.24 | 240 min: 100 CU |
| SCH 4 | Static temp.: 77° C. Circulation temp.: 45° C. Pressure: 26,910 KPa | 1.87 | — | 39 | 10.1 | — | 27.72 MPa | 40.88 MPa | 49.98 MPa | 5.20/ 6.24 | 170 min: 100 CU |
| SCH 5 | Static temp.: 93° C. Circulation temp.: 52° C. Pressure: 35,880 KPa | 1.87 | — | 36 | 8.16 | — | — | — | 39.62 MPa | 4.80/ 6.24 | 106 min: 100 CU |

TABLE VI

SENSIBILITY OF THE COMPOUND CEMENT 25/75 WITH FILTRATE REDUCERS

| TESTED FILTRATE REDUCERS | D 603 | PARA-GAS | HALAD 22 A | HALAD 14 | D 22 BJ | HALAD 9 | HALAD 22 | D 8 DOWELL | D 600 | D 19 BJ | HALAD 24 |
|---|---|---|---|---|---|---|---|---|---|---|---|
| CONCENTRATION IN wt % of cement | | | 1 | 1 | 1 | 1.5 | 1 | 1 | | 1 | 1 |
| CONCENTRATION liter/ton of cement | 14.8 | 40.74 | | | | | | | 177.8 | | |
| UTILIZED LIQUIFIER | D 80 | D 80 | CFR2L | — | D 31L | — | CFR2L | D 80 | D 80 | D 31L | CFR2L |
| CONCENTRATION liter/ton of cement | 14.8 | 4.94 | 4.94 | — | 4.94 | — | 4.94 | 4.94 | 6.2 | 4.94 | 4.94 |
| FILTRATE 30 min - 190° F. 6900 KPa - CC | 284 | 50 | 67 | 140 | 62 | 176 | 50 | 49 | 38 | 170 | 34 |

The evolution in course of time of the compressive strength of the following products has been tesed: the Portland cement used in the above-described example of a compound cement; this Portland cement admixed with 35 wt-% silica; the compound cement of the example; and this compound cement admixed with 35% of silica, all the slags having a density comprised between 1.87 and 1.90. Table VII (Page 15) shows the esults of these tests and it can be seen that the compressive strength of the compound cement without any addition of silica is excellent. FIG. 6 shows the evolution, as a function of time T (in days on the x-axis), of the compressive strength RC (in MPa on the y-axis) for the Portland cement (curve A) and for the compound cement (curve B) at a temperature of 200° C. Since the curves A and B are substantially parallel, it can be seen that the compressive strength of the compound cement (curve B) varies relatively less in course of time and maintains its initial difference with respect to the Portland cement alone.

The behavior of the compound cement has also been studied with respect to the cementation of areas with gases. Table VIII (Page 16) gives the results of these tests which are shown on FIGS. 7, 8, 9, 10, 11 and 12.

The migration of the gases generally takes place at the moment of the hardening of the cement, when the crystallization develops and the exothermicity increases, which creates phenomena of capillarity and pressure drops, so that the gas passes more easily.

The main methods which have been developed for avoiding the passing of gases create a so-called "gas barrier" which is generally created "in situ"; the stoppage of the gases results from the creation of a polymer (latex, synthetic resin) which makes the pores gas-tight by increasing the viscosity of the interstitial water of the cement during the hydratation or by creating a gas trap or a pressure effect (foaming surface-active agent, nascent gas).

TABLE VII

EVOLUTION AND COMPARISON OF THE COMPRESSIVE STRENGTHS (CS) TEST AT 200° C.

| COMPOSITION | CS 24 h (MPa)* | CS 3 days (MPa)* | CS in 7 days (MPa)* |
|---|---|---|---|
| Portland cement | — | 19.20 | 11.15 |
| Portland cement + 35% silica dust | 34.51 | 29.51 | 26.34 |
| Compound cement 25/75 | 46.42 | 40.27 | 36.90 |
| Compound cement 25/75 + 35% | 21.37 | 10.76 | 10.33 |

TABLE VII-continued

EVOLUTION AND COMPARISON OF THE COMPRESSIVE STRENGTHS (CS) TEST AT 200° C.

| COMPOSITION | CS 24 h (MPa)* | CS 3 days (MPa)* | CS in 7 days (MPa)* |
|---|---|---|---|
| Silica dust | | | |

*Megapascals

TABLE VIII

BEHAVIOUR OF THE COMPOUND CEMENT 25/75 IN THE CEMENTATION OF A GAS ZONE

| FORMULATIONS | DENSITY OF SLAG | TEST TEMP. | RESULTS AND COMMENTS |
|---|---|---|---|
| Cement class G-HSR + 177 l/t D-600 | 1.90 | 105° C. | Concentration of D-600 normally used for a cement of class G-HSR and at this temperature. There is no gas migration. |
| Compound cement 25/75 + 44 l/t D-600 | 1.90 | 105° C. | A concentration of D-600 four times lower gives excellent results at this temperature. There is no gas migration (FIG. 7) |
| Cement class G-HSR + 15% PARAGAS by vol. water | 1.90 | 105° C. | Concentration of PARAGAS normally used for a cement of class G-HSR and at this temperature. There is no gas migration. |
| Compound cement 25/75 + 15% PARAGAS by vol. water | 1.90 | 105° C. | This concentration is normally recommended for a cement of class G-HSR at this temperature. There is no gas migration (FIG. 8) |
| Compound cement 25/75 without additive against gas migration | 1.90 | 105° C. | At this temperature and without a specific additive, there is a gas migration, but the latter is very slow (FIG. 9). |
| Compound cement 25/75 + 5% PARAGAS by vol. water | 1.90 | 105° C. | A concentration of PARAGAS three times lower giving an excellent result. There is no gas migration (FIG. 10). |
| Compound cement 25/75 + 15% PARAGAS by vol. water | 2.20 | 160° C. | Concentration of PARAGAS normal for a cement of class G-HSR and at this temperature. There is no gas migration (FIG. 11) |
| Compound cement 25/75 + 5% PARAGAS by vol. water | 2.20 | 160° C. | A concentration of PARAGAS three times lower. Excellent result. There is no gas migration (FIG. 12) |

The results of various tests on cement-based slags are given on Table VIII (page 16), and they show that the slag of compound cement which is herein described has excellent properties with respect to the stoppage of the gas migration, this result being obtained with an amount of additive which is 3 or 4 times longer than the amount generally used. This property increases the economical interest of this type of compound cement.

FIGS. 7 to 12 show, for various formulations of this type of compound cement, the evolution, as a function of time T (in minutes on the x-axis), of temperatures t° and of pressures P (respectively in °C. and in bars, both on the v-axis). These temperatures t° are the temperature t°1 of the stratification at the bottom of the cement column and the temperature t°2 of the cement, and these pressues are the head pressure P1 and the pressure P2 of the stratification. A vertical dotted line D indicates the setting of the cement. All the formulations comprise a ratio cement/blast-furnace slag equal to 25/75 and they differ from one another by the additives. The correspondence between Table VIII and FIGS. 7 to 12 is indicated on this table.

Tables 9 and 10 (Pages 18 and 19) give the results of tests concerning the behaviour and the adaptability of formulations of slags which are respectively weightened and lightened, which are based on the type of compound cement described above, and which comprise a low amount of additives, this amount being anyway lower than that of a cement of the class G-HSR tested in the same conditions.

by the amount of tetracalcium aluminoferrite plus the amount of dicalcium ferrite plus two times the amount of tricalcium aluminate of up to 24%, the mesh size of said components being substantially similar, in the range of from 2800 to 3000 cm²/g.

TABLE IX

| BEHAVIOUR OF THE COMPOUND CEMENT IN FORMULATIONS OF WEIGHTENED SLAGS | | | | |
|---|---|---|---|---|
| SLAG Nr. | 1 | 2 | 3 | 4 |
| COMPOSITION FOR 1 cu,m OF SLAG: | | | | |
| TYPE OF CEMENT: | Compound 25/75 1425 kg | Compound 25/75 1182 kg | Class G-HSR 891 kg | Compound 25/75 1267 kg |
| HEMATITE (Weightener): | 313 kg (22%) | 768 kg (65%) | 519 kg (58%) | 443 kg |
| SILICA: | — | — | 267 kg (30%) | — |
| SOFT WATER: | 462 l | 452 l | 442 l | 465 l |
| ADDITIVE AGAINST GAS MIGRATION: | — | — | 74 l | 24 l |
| DISPERSANT (% by weight of cement): | D-65 (0.5%) | D-65 (0.8%) | D-65 (1.3%) | D-65 (0.75%) |
| RETARDER (% by weight of cement): | D-28 (0.2%) | D-28 (0.15%) | D-28 (0.25%) | D-28 (0.15%) |
| DENSITY OF THE SLAG: | 2.20 | 2.40 | 2.20 | 2.20 |
| PUMPABILITY TIME (minutes): | 330 | 427 | 232 | 432 |

Cementation: 4800 meters
Circulation temp.: 133° C.
Test pressure: 108 MPa

TABLE X

| BEHAVIOUR OF THE COMPOUND CEMENT IN FORMULATIONS OF LIGHTENED SLAGS. | | | |
|---|---|---|---|
| COMPOSITION FOR 1 cu.m OF SLAG | DENSITY OF SLAG | CEMENTATION OF TUBING CIRCULATION TEMP.: 52° C. PUMPABILITY TIME (min) | CEMENTATION OF TUBING CIRCULATION TEMP.: 79° C. PUMPABILITY TIME (min) |
| Cement class G-HSR: 829 kg Prehydrated bentonite: 16.6 kg Soft water: 730 l Retarder D-81: 4.2 l | 1.58 | 340 minutes (extrapolated) | — |
| Compound cement 25/75: 858 kg Prehydrated bentonite: 17 kg Soft water: 706 l | 1.58 | +360 minutes | 302 minutes |
| Cement class G-HSR: 829 kg Prehydrated bentonite: 16.6 kg Soft water: 730 l Retarder D-801: 8.30 l | 1.58 | — | 360 minutes |

We claim:

1. A cementitious composition for bore holes consisting essentially of (1) a first component consisting essentially of from 50% to 90% of a ground blast-furnace slag with a vitrification rate of 90 to 100% and (2) a second component consisting essentially of from 50% to 10% of a Portland cement, said Portland cement consisting essentially of from 0 to 6% magnesium oxide, from 0 to 3% sufur trioxide, from 0 to 3% tricalcium aluminate, an insoluble residue of from 0 to 0.75%, from 48 to 65% tricalcium silicate, and a total amount formed by the amount of tetracalcium aluminoferrite plus the amount of dicalcium ferrite plus two times the amount of tricalcium aluminate of up to 24%, the mesh size of said components being substantially similar, in the range of from 2800 to 3000 cm²/g.

2. Cement composition according to claim 1, consisting essentially of about 25 wt % of Portland cement and 75 wt % of ground slag.

3. Cement composition according to claim 1, wherein the vitrification rate of said slag is about 95%.

4. Cement composition according to claim 2, characterized in that the vitrification rate of said slag is about 95%.

* * * * *

UNITED STATES PATENT AND TRADEMARK OFFICE
CERTIFICATE OF CORRECTION

PATENT NO. : 4,877,452
DATED : October 31, 1989
INVENTOR(S) : ROUSSEL et al.

It is certified that error appears in the above-identified patent and that said Letters Patent is hereby corrected as shown below:

ON TITLE PAGE:

[73] Assignees:  Delete "both of Tokyo, Japan", insert therefor -- both of Paris, France --

Signed and Sealed this

Nineteenth Day of November, 1991

Attest:

HARRY F. MANBECK, JR.

Attesting Officer

Commissioner of Patents and Trademarks